US010287153B1

(12) United States Patent
Langiano et al.

(10) Patent No.: US 10,287,153 B1
(45) Date of Patent: May 14, 2019

(54) APPARATUS TO IMPLEMENT AUTOMATIC REFILLING FUNCTIONALITY FOR A LIQUID HOLDING TANK THAT IS THE FINAL TANK IN A FLOW-PATH-INTERCONNECTED SERIES OF TANKS

(71) Applicants: Michael William Langiano, Berthoud, CO (US); Michael Donald Langiano, Berthoud, CO (US)

(72) Inventors: Michael William Langiano, Berthoud, CO (US); Michael Donald Langiano, Berthoud, CO (US)

( * ) Notice: Subject to any disclaimer, the term of this patent is extended or adjusted under 35 U.S.C. 154(b) by 0 days.

(21) Appl. No.: 15/262,495

(22) Filed: Sep. 12, 2016

Related U.S. Application Data

(60) Provisional application No. 62/217,033, filed on Sep. 11, 2015.

(51) Int. Cl.
| | |
|---|---|
| *B67D 3/00* | (2006.01) |
| *F16K 21/18* | (2006.01) |
| *F16K 31/32* | (2006.01) |
| *F16K 33/00* | (2006.01) |
| *G05D 9/02* | (2006.01) |

(52) U.S. Cl.
CPC ......... *B67D 3/0003* (2013.01); *B67D 3/0061* (2013.01); *F16K 21/18* (2013.01); *F16K 31/32* (2013.01); *F16K 33/00* (2013.01); *G05D 9/02* (2013.01); *B67D 2210/0001* (2013.01); *Y10T 137/7404* (2015.04)

(58) Field of Classification Search
CPC . G01F 3/38; G01F 15/08; F16K 21/18; F16K 31/32; F16K 33/00; G05D 9/02; Y10T 137/7404; Y10T 137/741; Y10T 137/7475; Y10T 137/7478; Y10T 137/7481; Y10T 137/7485; Y10T 137/86187; Y10T 137/86196; Y10T 137/8622; B67D 2210/0001; B67D 3/0003; B67D 3/0061
USPC ........ 137/423, 424, 425, 445–448, 571–579; 73/224
See application file for complete search history.

(56) References Cited

U.S. PATENT DOCUMENTS

| | | | | |
|---|---|---|---|---|
| 1,080,547 | A | * 12/1913 | Gamble | ................... F02M 1/00 137/265 |
| 1,191,724 | A | * 7/1916 | Owens | ................. G05D 7/0635 137/12 |
| 1,457,153 | A | * 5/1923 | Elliott | ................ B01D 19/0021 96/159 |

(Continued)

*Primary Examiner* — Craig J Price (57) ABSTRACT

A tank refilling system is configured to keep liquid in a destination tank close to a predetermined destination tank fill line. The tank refilling system has a source tank connected to a destination tank with a flow through secondary process therebetween. Liquid flows between the tanks by gravity fed drainage. A single liquid supply channel to transfer pressurized supply liquid is comprised of a plurality of piping segments and one or more valves, all connected in series. A source tank mounted valve is configured to permit liquid to flow until the height of liquid level in the source tank reaches a predetermined level. A destination tank mounted valve is configured to permit liquid to flow until the height of liquid level in the destination tank reaches a predetermined level. The apparatus of the invention also prevents tank overflow for both the source tank and the destination tank.

3 Claims, 10 Drawing Sheets

(56) References Cited

U.S. PATENT DOCUMENTS

| | | | | |
|---|---|---|---|---|
| 1,776,019 | A * | 9/1930 | Elliott | B01D 19/0042 96/159 |
| 2,831,350 | A * | 4/1958 | Banks | G01F 3/38 73/200 |
| 2,872,817 | A * | 2/1959 | Pitts | G01N 1/14 73/224 |
| 2,938,381 | A * | 5/1960 | Smith | G01F 3/38 73/221 |
| 2,951,368 | A * | 9/1960 | Buchan | G01F 3/38 73/224 |
| 2,959,055 | A * | 11/1960 | True | G01F 3/38 137/391 |
| 3,021,709 | A * | 2/1962 | Walker | C10G 5/00 73/200 |
| 3,023,618 | A * | 3/1962 | Franklin | G01F 3/38 73/224 |
| 3,041,876 | A * | 7/1962 | Barra | G01F 3/38 73/224 |
| 3,071,002 | A * | 1/1963 | Scott | G01F 3/38 73/224 |
| 3,081,630 | A * | 3/1963 | Willis | G01F 3/38 73/224 |
| 4,737,037 | A * | 4/1988 | Mojonnier | B01F 15/0412 137/606 |
| 9,195,238 | B2 * | 11/2015 | Roden | G05D 9/00 |
| 2012/0248141 | A1 * | 10/2012 | Sano | B67D 3/0003 222/67 |
| 2015/0360930 | A1 * | 12/2015 | Daniels | B67D 7/04 222/56 |
| 2016/0107874 | A1 * | 4/2016 | Wang | B67D 1/07 222/1 |

\* cited by examiner

APPARATUS TO IMPLEMENT AUTOMATIC REFILLING FUNCTIONALITY FOR A LIQUID HOLDING TANK THAT IS THE FINAL TANK IN A FLOW-PATH-INTERCONNECTED SERIES OF TANKS

RELATED APPLICATION

This application claims the benefit of the Provisional Patent Application entitled "An Apparatus to Implement Automatic Refilling Functionality For A Liquid Holding Tank That Is The Final Tank In A Flow-Path-Interconnected Series Of Tanks," application No. 62/217,033, filed Sep. 11, 2015 by the present inventors, which is incorporated by reference.

BACKGROUND

The embodiments herein disclosed relate generally to systems that move liquids from one vessel to at least one other vessel wherein the volumes and flow rates of the liquid being moved is controlled by a coordination of the simultaneous volumes and levels of liquid in each of the vessels at the same time.

The invention embodiments disclosed offer numerous improvements to many exiting multiple tank liquid storage and liquid transfer systems. One example of such multiple tank liquid handling systems is the common tabletop gravity fed water purification and filtration systems on the market currently. Such systems usually consist of two liquid holding tanks, one physically situated above the other, with a set of flow through water purification/filtration components that have a porous outer surface situated in the liquid flow path between the tanks. Unpurified water is poured into the upper tank, and the water flows by the force of gravity, out of the upper tank, into and through the water purification/filtration components, and then into the lower tank where it is stored as purified water.

Prior to embodiments disclosed here, existing systems have inherent in their design and construction the inconvenience that they need to be refilled manually. This is because the existing systems do not consist of means to automatically refill the tanks, nor are they comprised of means to detect when the purified water in the lower tank is below a desirable minimum level that indicates that refilling is needed. It is necessary for the user of the existing systems to observe when the lower tank is becoming empty which indicates that a manual refill is required, and then to refill the system manually by adding water to the upper tank. It is common with many of these existing systems for the user to need to refill them every day or so, based on how much of the purified water is drawn from the lower tank for drinking. The need for the user to refill the system manually on a repetitive basis is very inconvenient and an undesirable task. The manual refill procedure is performed by the user adding unpurified water to the upper tank. All of the liquid added to the upper tank will flow into and through a secondary process situated in the liquid flow path between the tanks, and then into the lower tank. In many cases the liquid flow rate through the secondary process will be very low and this low flow rate makes it very difficult for the user performing the manual refill procedure to judge correctly what volume of liquid, when added to the upper tank, will be too much, and thus will eventually cause the lower tank to overflow. These highly undesirable overflow events are frequent occurrences experienced by users of existing systems. The existing systems being manufactured and sold currently, are built lacking means to initiate and perform automatic refilling, and also lacking means to prevent tank overflows, and thus were the background and motivation for the embodiments of the invention disclosed herein.

SUMMARY

Throughout this specification, the terms "upper tank" and "source tank" are used interchangeably and refer to the same element. The terms "lower tank" and "destination tank" are used interchangeably and refer to the same element.

Each of the various embodiments of the invention disclosed here consist of arrangements of liquid holding tanks, liquid level sensing devices, liquid flow rate control components, piping, and secondary process elements, arranged in such a manner as to route all of the liquid that exists in an upper, or source, one of the tanks to flow into a secondary process, and then to flow out of the secondary process into a lower, or destination, tank through a destination tank liquid entrance opening. The source tank is positioned higher than the destination tank to cause the liquid to flow between the tanks by the process of gravity fed drainage. The secondary processes in the embodiments can have inherent liquid flow rates that are usually much lower than the flow rate of the pressurized liquid entering the source tank during a refill cycle. Each of the various embodiments disclosed here have means to perform a refill cycle, and to avoid tank overflow occurrences, even in systems that are comprised of secondary processes with very low flow rates.

Aspects of the embodiments of the invention have inherent functionality to detect when the volume of liquid in the lower tank is below a desirable minimum level, and when such level is detected, to begin automatically a multiple step cycle to refill the system to an optimum full condition. In the embodiments that have two float valves, one is installed in the source tank, and the other is installed in the destination tank. The float valve installed in the source tank is for increasing and decreasing the liquid flow rate between that valve's inlet port and its outlet port, based on the level of the height of liquid level being sensed in the source tank, which is indicated by how high the float valve's ball float is above the source tank's interior bottom surface 152. Likewise, the float valve installed in the destination tank, in the embodiments in which it is used, is for increasing and decreasing the liquid flow rate between that valve's inlet port and its outlet port, based on the height of liquid level being sensed in the destination tank by how high the float valve's ball float is above the destination tank's interior bottom surface 158. As depicted in FIGS. 1 through 9, these float valves are plumbed in series in a single liquid flow channel that is carrying liquid from a source of pressurized liquid, up to a source tank liquid entrance opening. This series, or tandem, connection of the two float valves is a novelty that allows the apparatus to perform as intended in systems with very low liquid flow rate secondary processes. In systems with very low liquid flow rate secondary processes, the destination tank valve has no way of sensing the height of liquid level in the source tank, in a timely fashion, and thus cannot react in time to restrict the pressurized supply liquid flowing into the source tank in order to prevent having either the source tank, the destination tank, or both overflow. In embodiments that use only one float valve, a separate float valve for the destination tank is replaced by a ball float in the destination tank connected to a mechanical linkage such as a rigid lever arm having one of its ends connected to the float in the destination tank and having its other end connected to the control input of the float valve mounted in the source tank such that the source tank valve can respond to two independent control inputs, in a manner that mimics the behavior of two separate float valves plumbed in series as is done in the other embodiments. This connection to the control input of the source tank valve can be either a direct connection, on alternatively be a mechanical blockage that limits the normal distance the ball float and/or the float rod of the source tank valve can travel in the downward direction. In other words, a mechanical linkage can cause the source tank valve components to be "held upwards" higher than they would be when the height of liquid level in the source tank is low.

A first embodiment is configured such that a single liquid flow channel is created to route liquid from a pressurized supply source, first to a float valve mounted inside a lower, or destination, tank and then to another float valve connected in series with first float valve, mounted in an upper, or source, tank and then into a source tank liquid entrance opening. The two serial connected float valves operate to control the overall liquid flow rate through the single flow channel of pressurized supply liquid, such that the liquid flow rate in the single flow channel is restricted to a flow rate matching the flow rate setting of the valve that is set to the most restrictive flow rate. The series connected valve set to be the more restrictive flow rate, being dominant. The liquid flow rate in the entire supply liquid channel will be controlled by the valve that is adjusted to the more restrictive flow rate setting, as is typical for two valves plumbed in series, instead of in parallel.

Another possible embodiment, is configured such that the flow path of the pressurized supply liquid is routed first to a float valve mounted inside an upper, or source, tank and then connected in series to another float valve mounted in the lower, or destination tank, and then into the source tank. The two serial connected float valves operate on the single flow channel of pressurized supply liquid, with the valve set to a more restrictive flow rate being dominant. The liquid flow rate in the entire supply liquid channel will be set by whichever of the float valves that is adjusted for the more restrictive flow rate setting, as is typical for two valves plumbed in series, instead of in parallel.

The embodiments of the invention disclosed herein are comprised of new and novel features, configurations, and interconnections of elements. The topologies of these new embodiments provide novel functionality and performance improvements over prior art systems. There are also novel configurations between the elements such as liquid holding tanks, liquid level sensing devices, flow rate control valves, and the plurality of piping elements. The embodiments disclosed here are comprised of two liquid holding tanks with a secondary process in the liquid flow path between the tanks, an example being a set of flow through water purification filters. A source tank, a destination tank, and a plurality of water purification filters are positioned relative to each in the vertical dimension, with the source tank being positioned above the purification filters, and the destination tank being positioned below the purification filters, to allow the liquid to flow freely between the tanks by the process of gravity fed drainage. The source tank is filled with unpurified water that drains by the force of gravity, out of the source tank, into and through the water purification filters, and into the destination tank where it is stored as purified water.

The benefits of the embodiments disclosed are made available not only to systems where the secondary process is water purification, but to systems with a wide variety of secondary processes. Most secondary processes, including the water purification filtering, have inherent in them a restriction to the liquid flow rate that results in a very long time required for the liquid to flow through them as compared to a secondary process with a far less flow-rate restriction, such as a simple fill port, or a simple hole between the tanks. The embodiments disclosed are also novel over prior art apparatus that implement automatic tank refilling in systems that have a secondary process that does not have inherent low flow rate restrictions. One novelty is tank overflow prevention and self-detection of an empty destination tank.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Numerous advantages are realized by the embodiments disclosed herein. Some of these advantages are described in the list below.

1) Elimination of the need inherent in the prior art systems that they be refilled manually by the user.
2) The ability to self detect when the lower, or destination, tank is becoming empty, and then to automatically begin an autonomous cycle to refill the system in a precise and repeatable manner, while at the same time eliminating any tank overflow occurrences common to the prior art systems.
3) There is no need for electricity or computer functionality for the embodiments to initiate and then sequence correctly through a series of exemplary states in the refill cycle as disclosed.
4) The embodiments make possible the use of tanks that are smaller than the tanks needed in the prior art systems to achieve the same performance characteristics. Because most of the systems being sold today use tanks made of expensive food grade stainless steel, this would result in reductions in the cost of the materials to manufacture the systems. These cost reductions represent a very desirable benefit, both for a manufacturer, and eventually for the consumer.

5) Many of the prior art systems available, such as the popular gravity fed, water purification systems, are comprised of the secondary process elements that are very expensive flow through filter elements having a porous outer surface. The embodiments make possible the use of considerably smaller filter devices than are needed to achieve the same performance characteristics as in the prior art systems. The smaller filter devices result in reductions in the cost of materials to manufacture the systems. This represents a very desirable benefit, both for a manufacturer, and eventually for the consumer.

Figure 1:
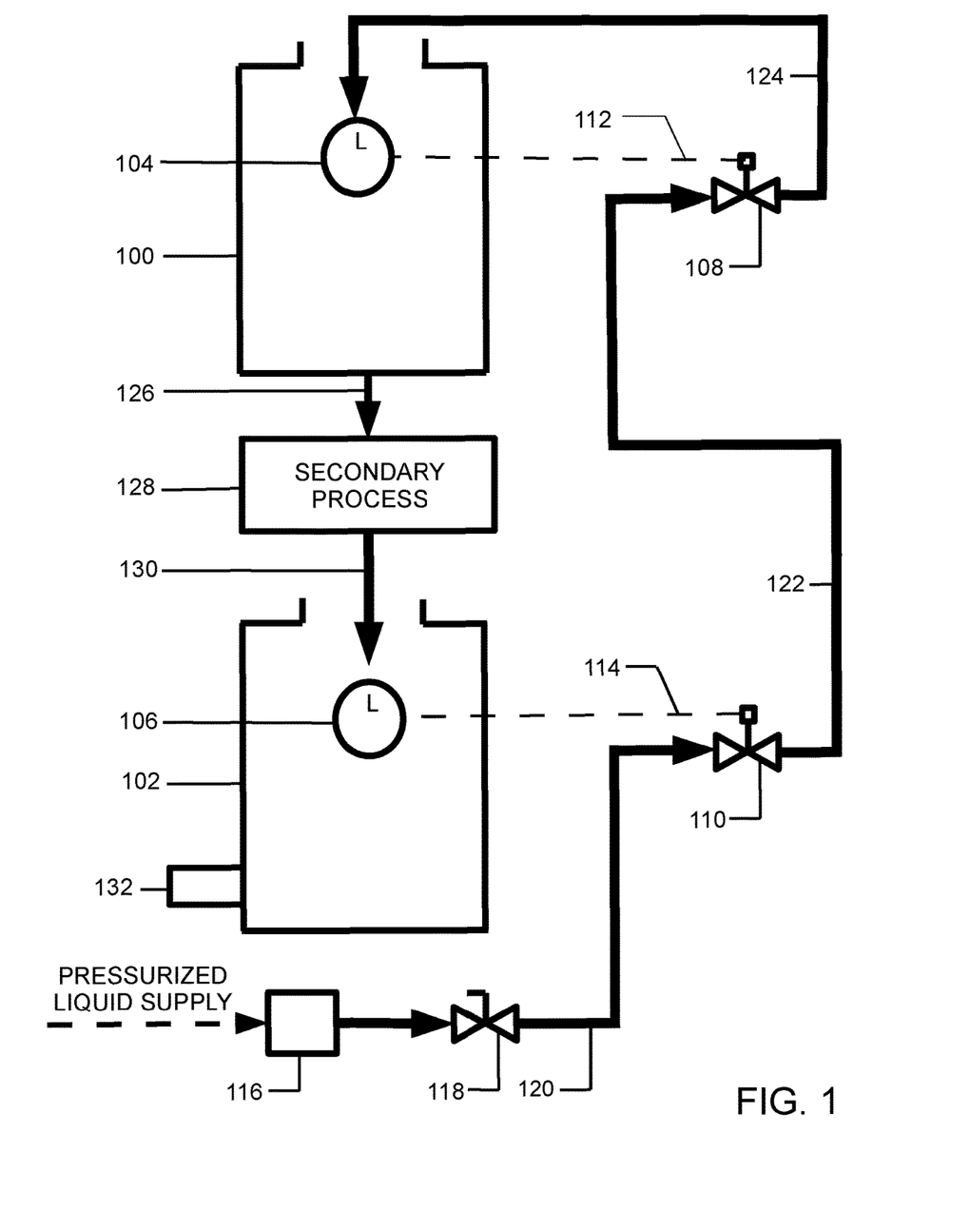
FIG. 1 is a P&ID drawing of a first and a second embodiment, identifying each of the components and the interconnection of the components in a schematic format.
Figure 2:
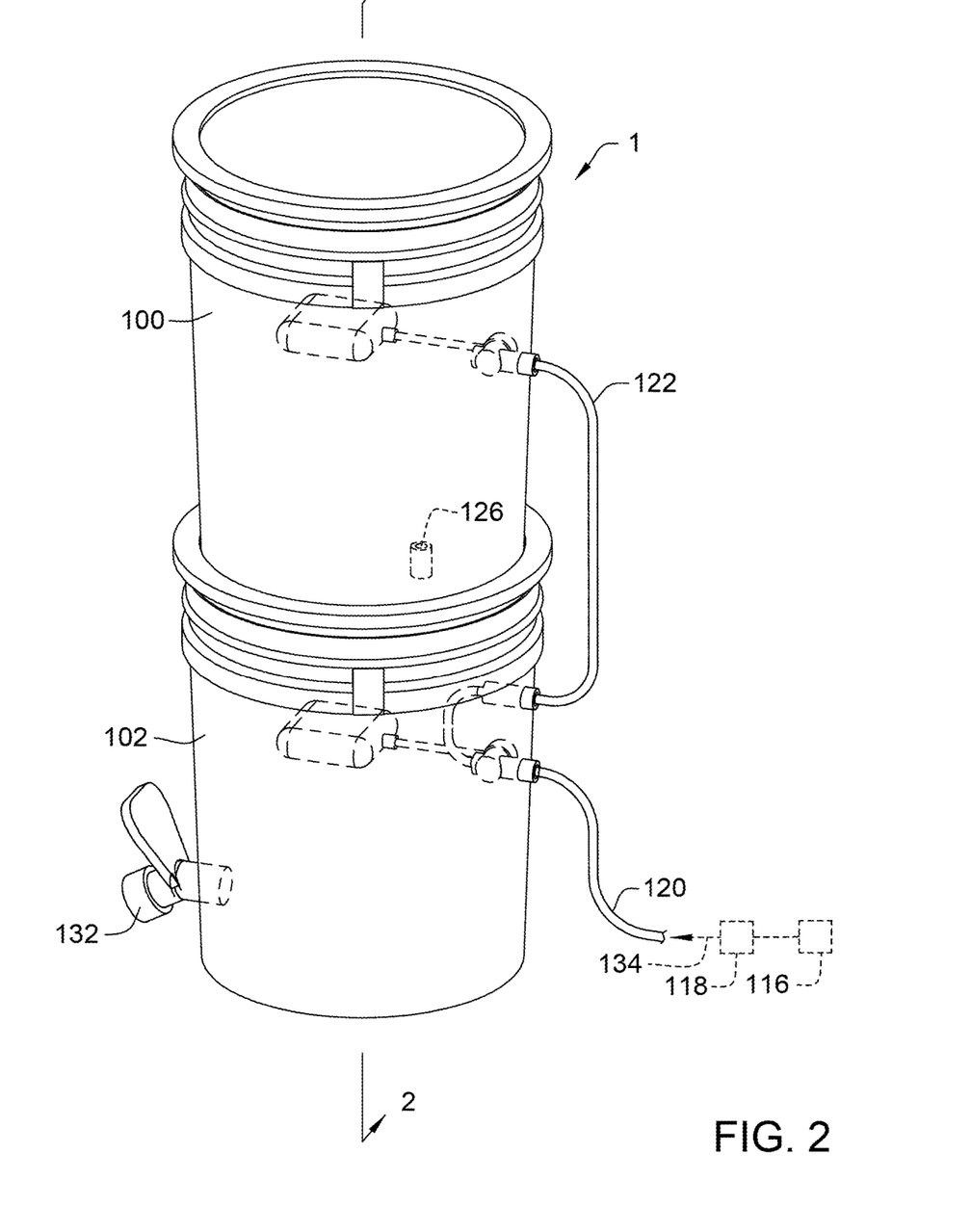
FIG. 2 is a perspective view of a first embodiment.
Figure 8:
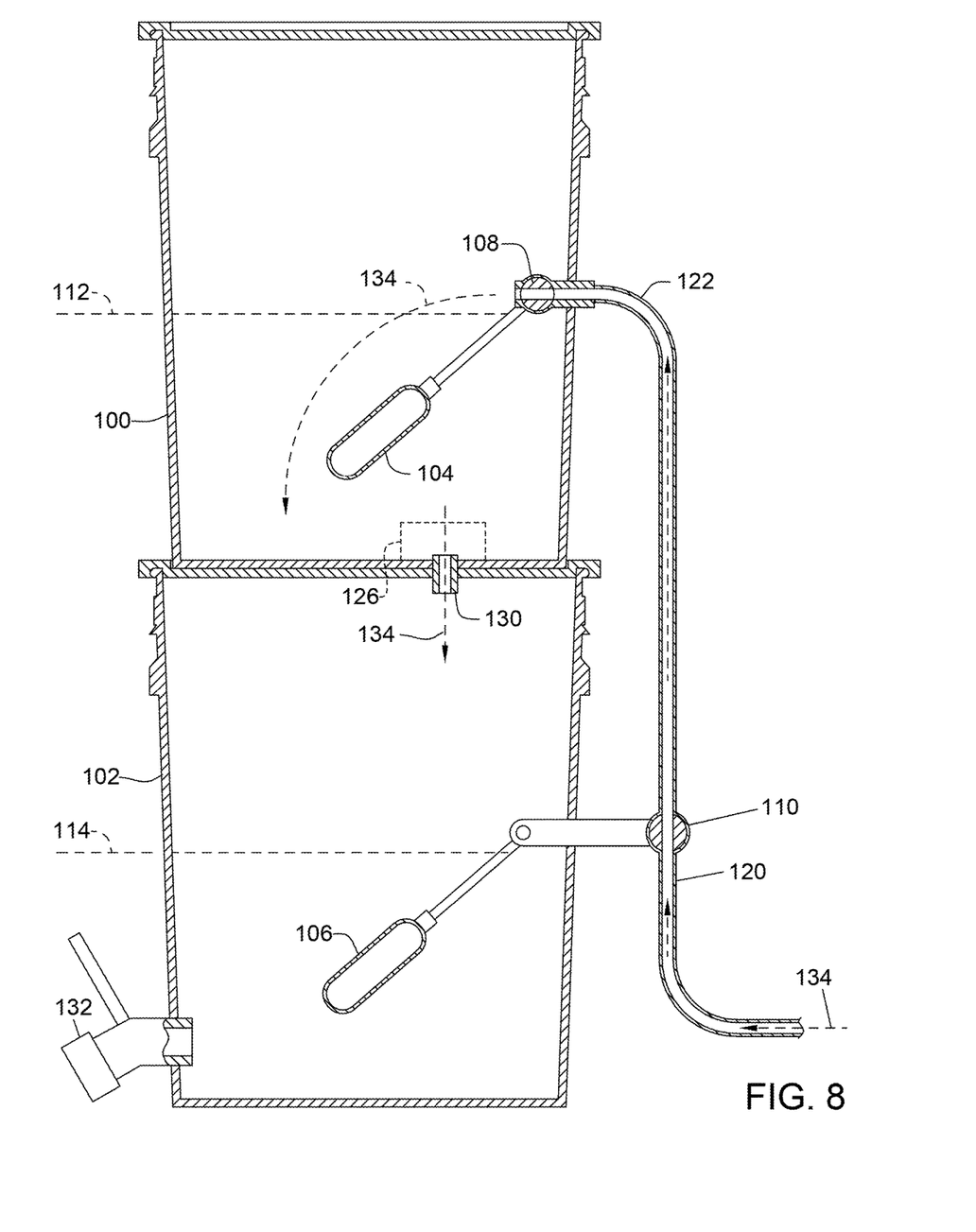
FIG. 8 is a section detail view of the second embodiment taken along line 2-2 in FIG. 7, shown in an exemplary first (empty) state.
Figure 9:
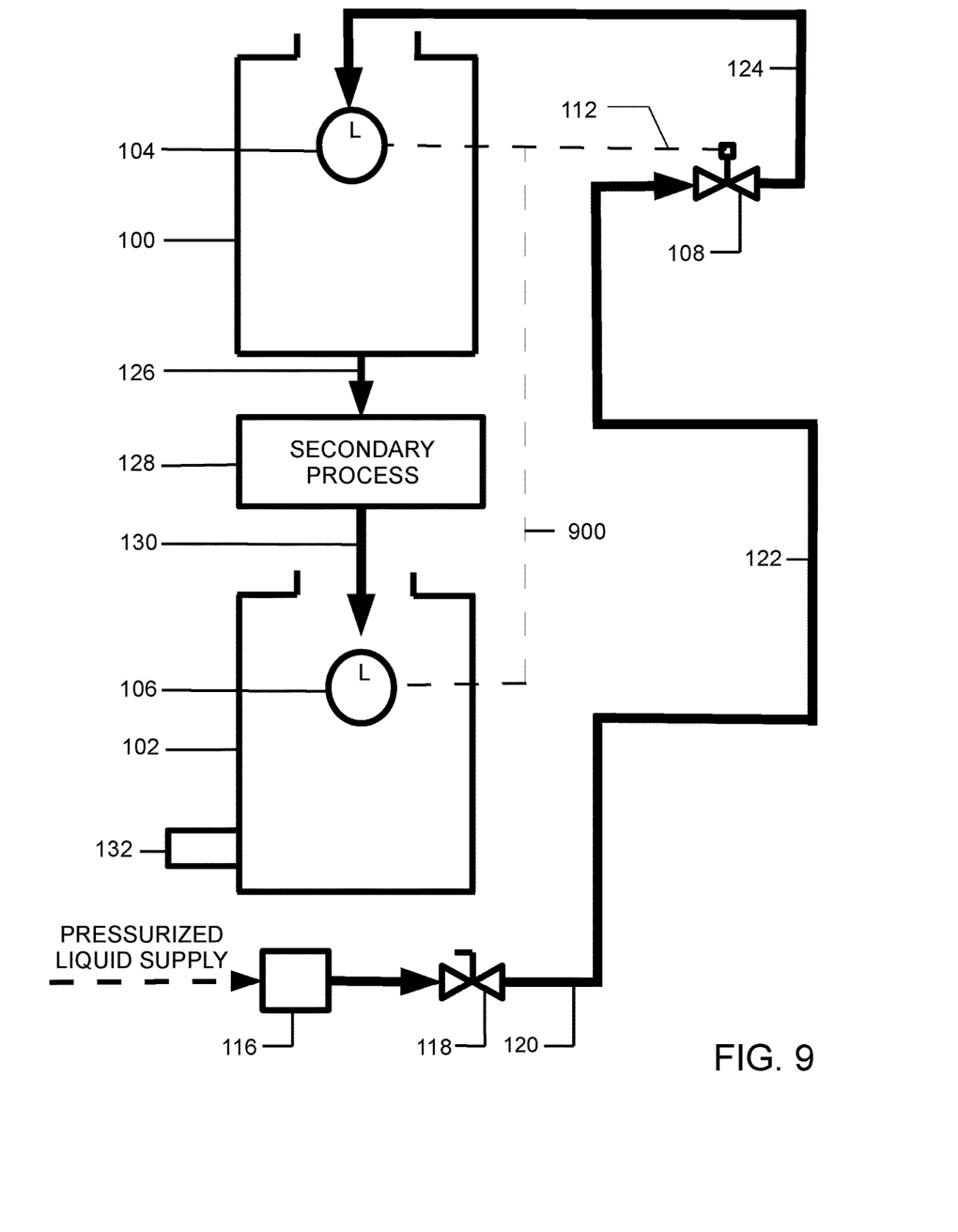
FIG. 9 is a P&ID drawing of a third embodiment, depicting each of the components and the interconnection of those components in a schematic format.

FIGS. 1 and 9 depict in P&ID schematic format various embodiments that are described here, along with the element number used for each element. The table below lists each element by its number as depicted in the figures, and its corresponding name. Element 134, the liquid in the system, is depicted in FIGS. 2, 3, 4, 5, 7, and 8 and is included in this description for reference and completeness, and to make this specification more clear, and precise. Element 118, a manually operated valve is optional and is not included in the claims, but is included to make the description of the invention in this specification more clear, precise, and easier to understand. A piping segment, shown as element 120 in FIGS. 1 and 9 is not included in the claims, but is shown to make the description of the invention in this specification more clear, precise, and easier to understand.

| List of elements depicted in the figures | |
|---|---|
| Element Number | Element Name |
| 100 | source tank |
| 102 | destination tank |
| 104 | ball float of the source tank valve |
| 106 | ball float of the destination tank valve |
| 108 | source tank valve |
| 110 | destination tank valve |
| 112 | float rod of the source tank valve |
| 114 | float rod of the destination tank valve |
| 116 | liquid supply connection |
| 118 | manually operated valve |
| 120 | third piping segment |
| 122 | first piping segment |
| 124 | second piping segment |
| 126 | secondary process liquid inlet |
| 128 | secondary process |
| 130 | secondary process liquid discharge outlet |
| 132 | destination tank liquid discharge valve |
| 134 | the liquid in the system |
| 150 | source tank maximum level |
| 152 | source tank interior bottom surface |
| 154 | destination tank maximum level |
| 156 | destination tank transition level |
| 158 | destination tank interior bottom surface |
| 900 | destination tank alternate float rod |

In all of the embodiments here disclosed, a source tank 100 is positioned above a destination tank 102, high enough to allow liquid to drain out of source tank 100, and into destination tank 102, by the force of gravity.

In all of the embodiments here disclosed, a secondary process 128, is comprised of one or more secondary process liquid inlet(s) 126, that are in liquid communication with source tank 100, and one or more secondary process liquid discharge outlet(s) 130, that are in liquid communication with destination tank 102, such that a liquid flow path between the tanks is formed. An example of the secondary process liquid inlet(s) 126 is the porous outer surface of a flow through water filter.

In all of the embodiments here disclosed, the descriptions are written assuming that manually operated valve 118 is used.

The valves in embodiments one and two for destination tank valve 110 and source tank valve 108 are float valves of the common bulkhead mounting style with an integral float rod connected between a ball float and a flow rate control input. This design of float valve, when bulkhead mounted through the sidewall of a tank, has its outlet port on the same end of the valve that will be inside the tank, and its inlet port on the same end of the valve that will be outside the tank. For example, in these two embodiments, the outlet port of destination tank valve 110 will be inside destination tank 102, and the inlet port of destination tank valve 110 will be outside destination tank 102. The outlet port of source tank valve 108 will be inside source tank 100, and the inlet port of source tank valve 108 will be outside source tank 100. Source tank valve 108 is mounted in the sidewall of source tank 100 with its ball float 104 and its float rod 112 being inside of source tank 100. Destination tank valve 110 is mounted in the sidewall of destination tank 102 with its ball float 106 and its float rod 114 being inside of destination tank 102.

The valves in embodiment three for destination tank valve 110 and source tank valve 108 are float valves of the common pipe mounting style. This design of float valve, when mounted has both its inlet port and its outlet port outside of a tank in which it is being used.

Other embodiments are possible that use one each of the two different valve styles used in embodiments one, two, and three.

A first embodiment is depicted in FIGS. 2, 3, 4, 5, and 6. One end of a third piping segment 120 is connected to the outlet port of manually operated valve 118. The other end of the third piping segment 120 is connected to the inlet port of destination tank valve 110. One end of a first piping segment 122 is connected to the outlet port of destination tank valve 110, first piping segment 122 is then routed back outside of destination tank 102 through a hole located at any convenient place in the sidewall or another surface of destination tank 102, such that there will be no pathway for the liquid to be deposited directly into destination tank 102. The other end of first piping segment 122 is connected to the inlet port of source tank valve 108. One end of a second piping segment 124 is connected to the outlet port of source tank valve 108, and the other end is connected to a source tank liquid entrance opening.

Second, third and fourth embodiments are described in the paragraphs below.

Figure 7:
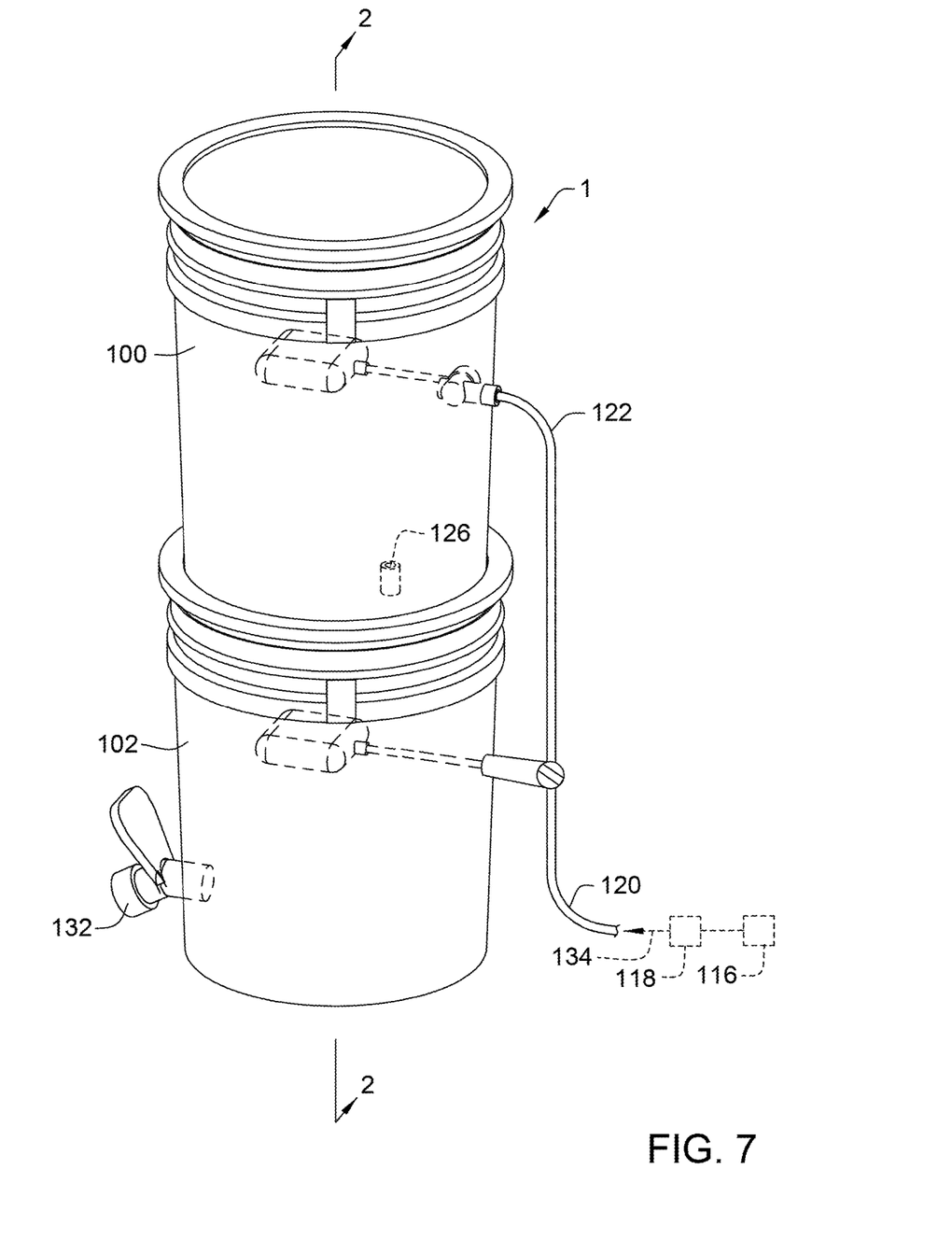
FIG. 7 is a perspective view of the second embodiment.

A second embodiment, depicted in FIGS. 7 and 8, is identical to the first embodiment, except that the float valves used in this embodiment are of the pipe mount style, and the float valves used in embodiment one are of the bulkhead mount style.

A third embodiment, not depicted in the figures, is identical to the second embodiment, except that the float valves used in this embodiment are of the pipe mount style, and the float valves used in embodiment two are of the bulkhead mount style.

A fourth embodiment is depicted in FIG. 9. This embodiment is similar to the previously described embodiments, but with destination tank valve 110 eliminated and only the ball float 106 of the destination tank valve 110, attached to a destination tank alternate float rod 900, is used to sense the height of liquid level in destination tank 102. Destination tank alternate float rod 900 is configured to provide an obstruction that will interfere with the normal rising and falling of the source tank ball float 104 and source tank float rod 112 by setting a lower limit below which the source tank ball float 104 and source tank float rod 112 assembly cannot fall. The height of this lower limit rises and falls with the height of liquid level existing in destination tank 102 at any moment in time because the ball float 106 of the destination tank valve 110 is rising and lowering with the height of liquid level in destination tank 102.

The new flow control behavior of the configuration in this embodiment will be equivalent to the flow control behavior of a system that has two separate float valves connected in series with each other in a common flow channel. The two separate valves used in the first, second and third embodiments, are indeed physically connected in series by the piping segments.

The flow control behavior of the series connection pair, is different from the flow control behavior of either of the valves individually, and different to flow control behavior that would result from a pair float valves connected in parallel.

The flow control behavior of the series connected pair is an essential feature of the embodiments disclosed herein. Briefly, the flow control behavior of the series connected pair will be such that valve that is a state of a more restricted flow will be dominant over the other valve. For example if one of the valves is fully open and the other valve is fully closed, the combined result will be a complete restriction of to the flow. The elimination of destination tank valve 110, by this embodiment would result in significant cost savings, both to a manufacturer, and to the consumer.

The components and their interconnection disclosed for all of the embodiments disclosed herein, realize an autonomous refill cycle that is automatically started when the level of liquid in destination tank 102, falls below a preselected minimum level.

The steps of the refilling cycle will sequence the system through four exemplary states. These exemplary states are depicted in—FIGS. 3, 4, 5, and 6. The heights of the liquid levels existing in the two tanks when the system is in each of the four exemplary states are depicted in FIGS. 3, 4, 5, 6, and 10.

Figure 10:
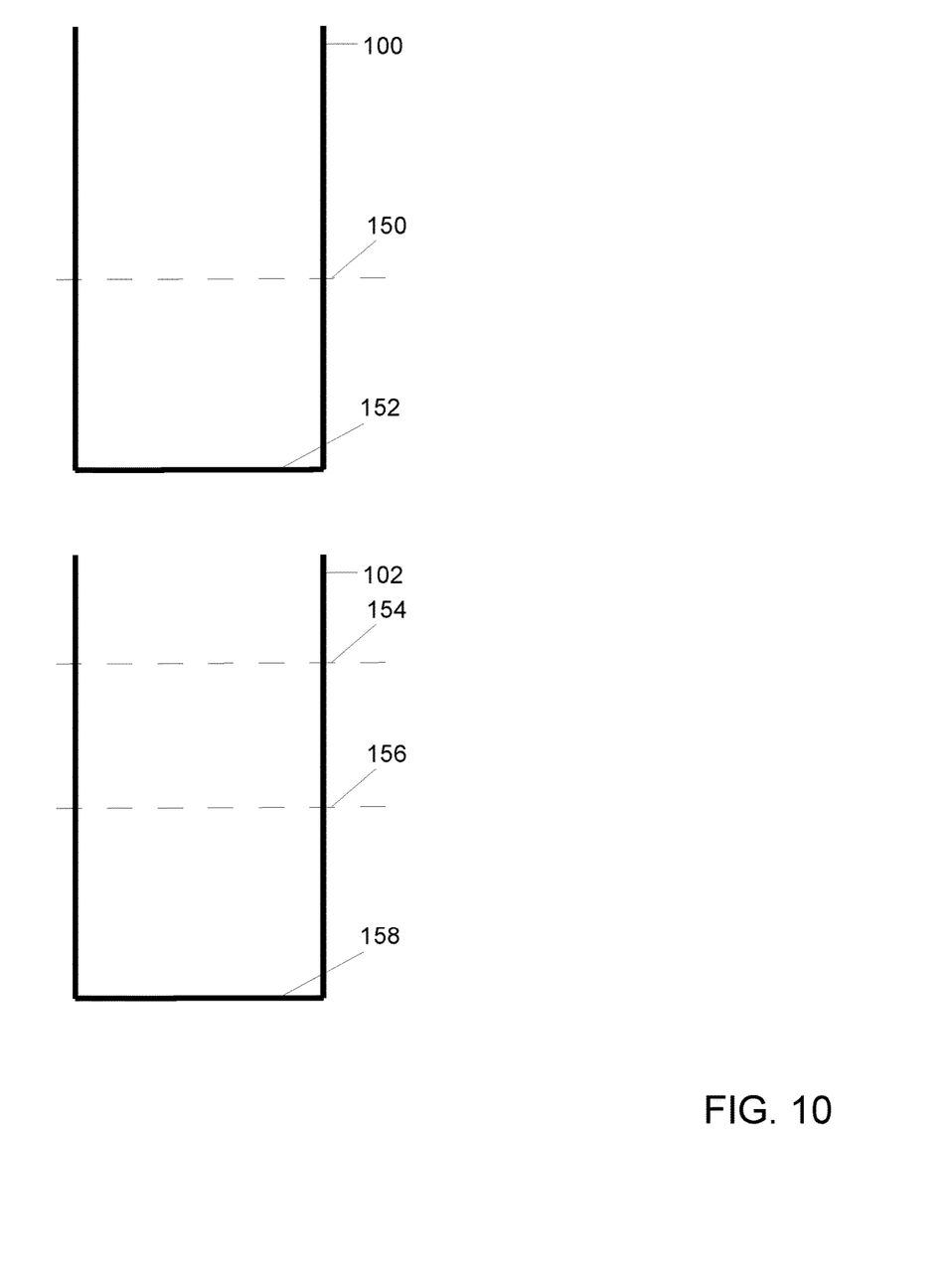
FIG. 10 depicts the definition of some critical liquid levels that will exist in the system as it goes through its automatic refill cycle.

FIG. 10 depicts a number of important liquid levels, and these numbers are used to provide more clarity in the descriptions included in this specification. The liquid levels and the numbers for each that are depicted in FIG. 10 are the same for all of the embodiments.

Figure 3:
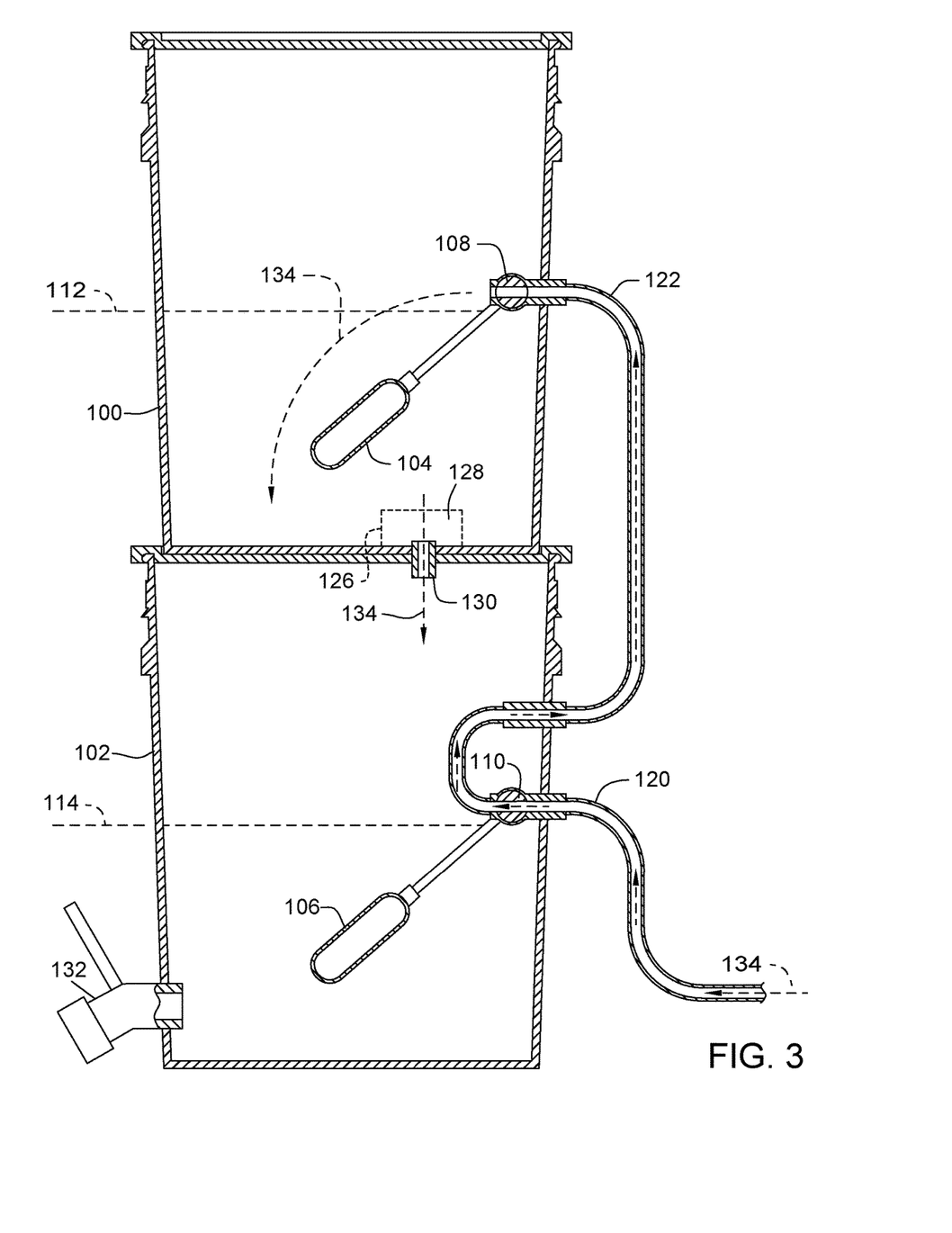
FIG. 3 is a section detail view of a first embodiment taken along line 2-2 in FIG. 2, shown in an exemplary first (empty) state.
Figure 4:
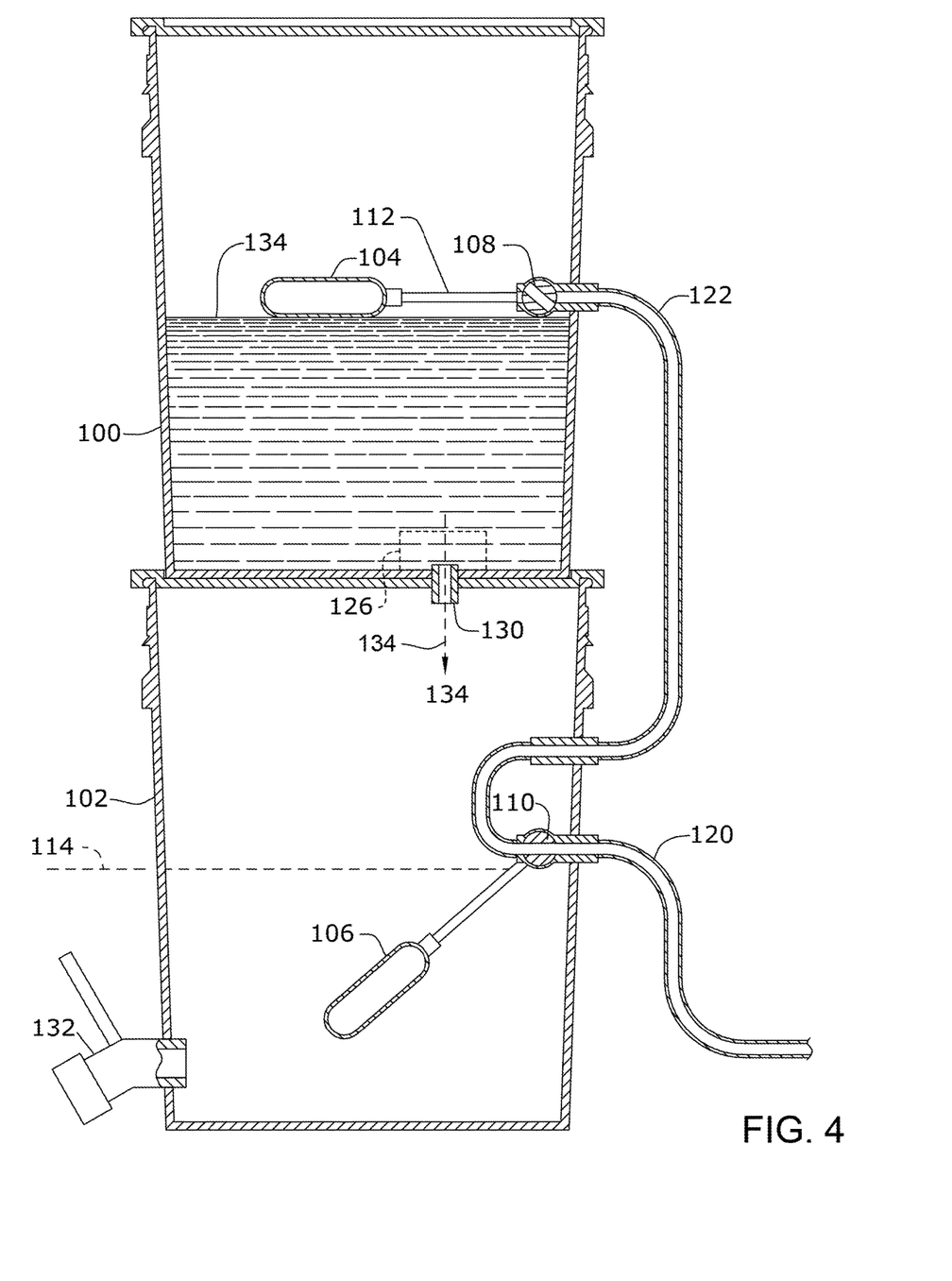
FIG. 4 is a section detail view of a first embodiment taken along line 2-2 in FIG. 2, shown in an exemplary second state.
Figure 5:
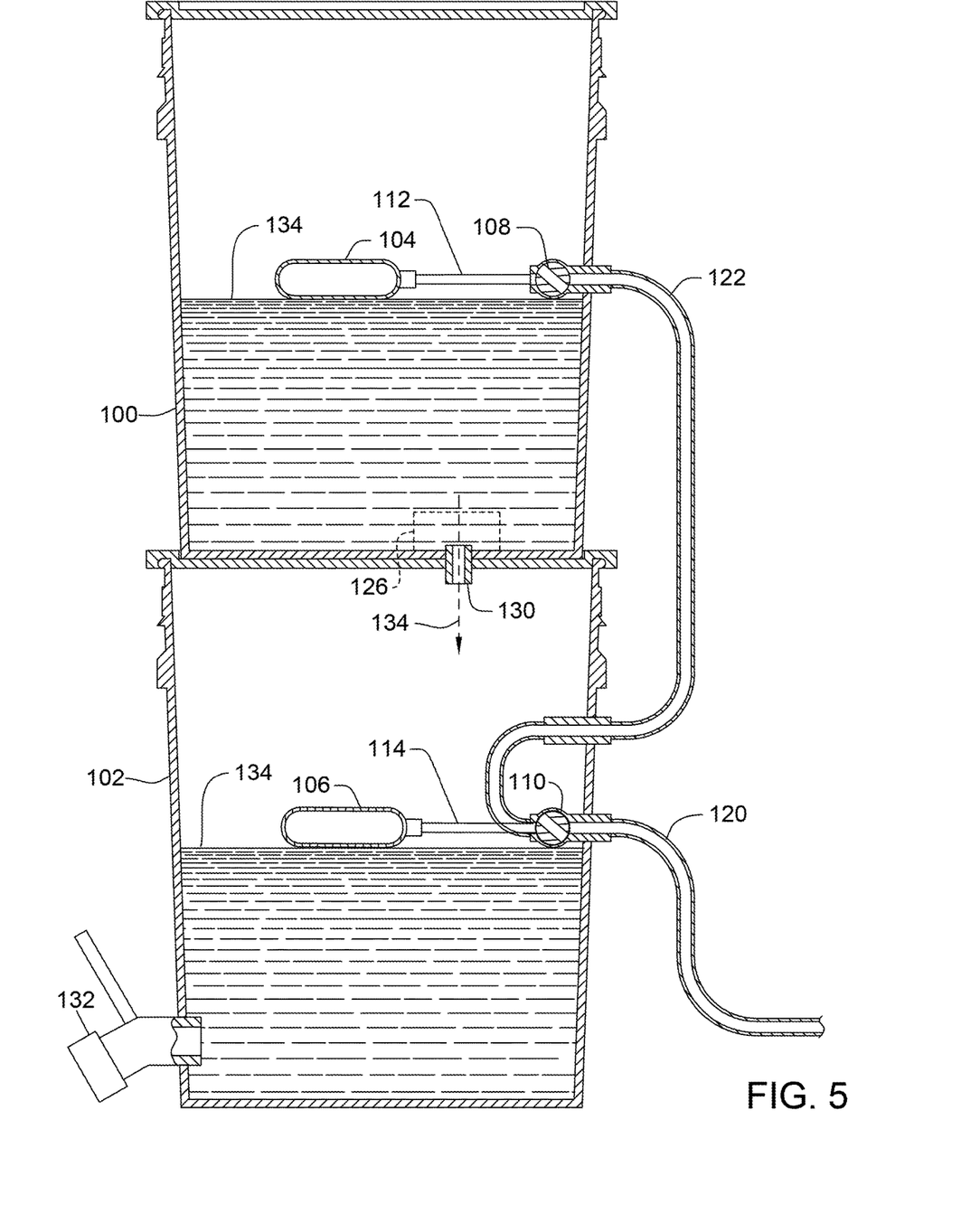
FIG. 5 is a section detail view of a first embodiment taken along line 2-2 in FIG. 2, shown in an exemplary third state.
Figure 6:
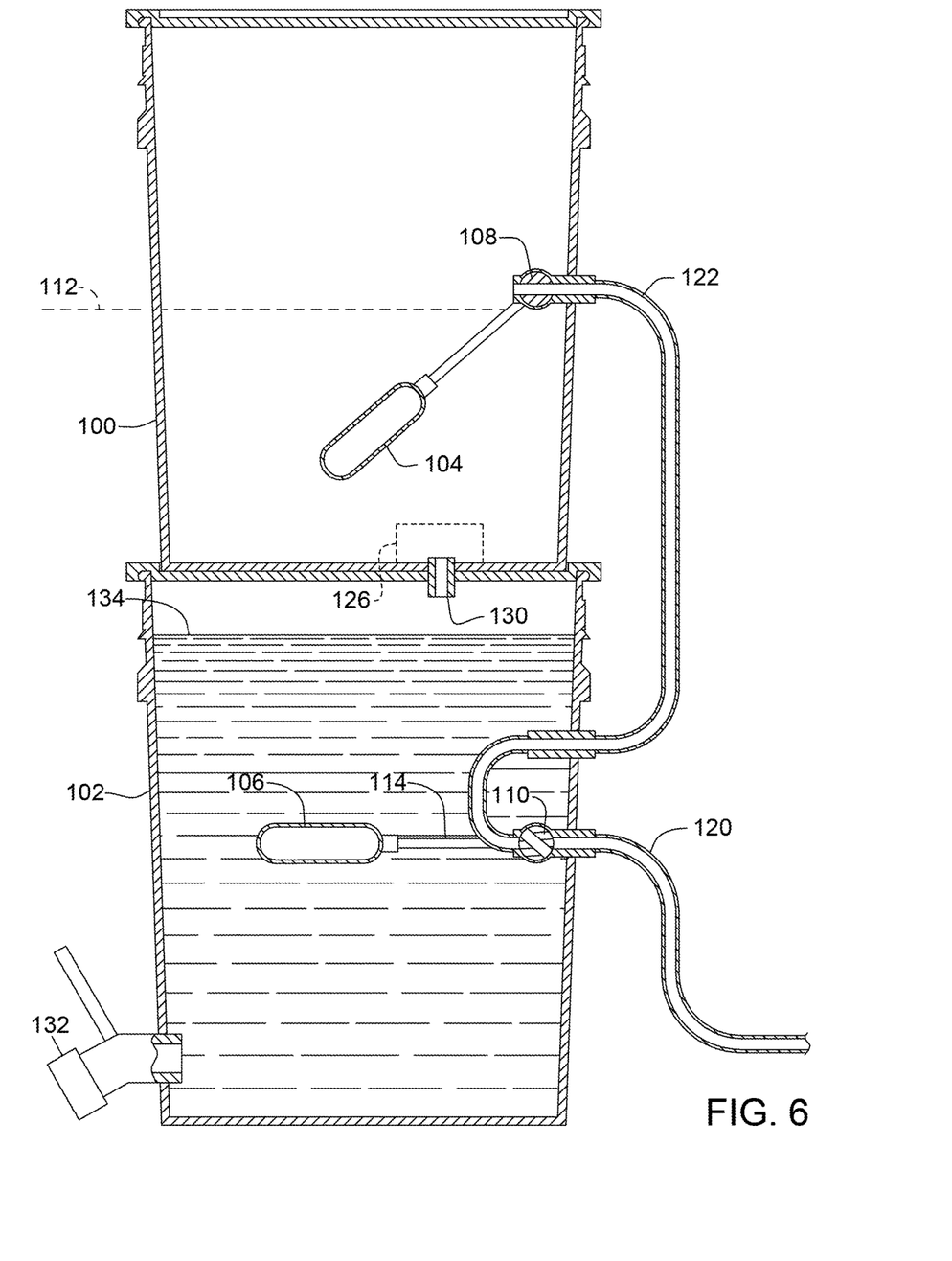
FIG. 6 is a section detail view of a first embodiment taken along line 2-2 in FIG. 2, shown in an exemplary fourth state (filled).

FIG. 3 depicts the system in an exemplary first state. FIG. 4 depicts the system in an exemplary second state. FIG. 5 depicts the system in an exemplary third state. FIG. 6 depicts the system in an exemplary fourth state.

Exemplary states in a refill cycle.

| Exemplary State | Liquid Level in Source Tank 100 | Liquid Level in Destination Tank 102 | Source Tank Valve 108 | Destination Tank Valve 110 | Flow rate of the supply liquid |
|---|---|---|---|---|---|
| First | Empty | Empty | Fully open | Fully open | Maximum |
| Second | Maximum and being regulated by the Source Tank Valve 108 | Still very close to being empty but increasing very slowly | Nearly closed and regulating the liquid level in the Source Tank 100 | Fully open | Reduced to a flow rate consistent with the liquid level in the Source Tank 100, being regulated by Source Tank Valve 108 |
| Third | Mid level | Mid level and being regulated by the Destination Tank 110 | Nearly closed and regulating the liquid level in the Source Tank 100 | Nearly closed and limiting the liquid flow into the Source Tank 100 | Nearly fully restricted |
| Fourth | Empty | At maximum (full) level | Fully open | Fully closed | No liquid flow |

The refill cycle is complete when the system enters the fourth exemplary state. The system will remain in this fourth exemplary state until the user draws enough of the liquid from the destination tank 102, by using the destination tank liquid discharge valve 132, so that the liquid level in the destination tank 102 falls to a level that will allow the destination tank valve 110, to again begin to open and allow the pressurized liquid to flow to source tank 100. The liquid now flowing in the system indicates that a new refill cycle is occurring. This sequence of steps will automatically repeat anytime the liquid level in destination tank 102 falls below the level that causes destination tank valve 110 to transition from fully closed to partially open. The liquid level decreasing through this level automatically initiates another refill cycle.

In order to make the discussion of the description of the embodiments more understandable in this specification, a set of liquid levels and liquid volumes have been predefined and given both text labels and abbreviations. These terms are only for the purpose of making this discussion more clear and understandable.

A volume of liquid is associated with each of the three aforementioned liquid levels. The liquid volumes associated with each of the liquid levels, are labeled and the abbreviations used herein to refer to them are described in the following table.

| Liquid Level/Abbreviation | Corresponding Liquid Volume/Abbreviation |
|---|---|
| Source Tank Maximum Level/STML | Source Tank Maximum Level Volume/STMLV |
| Destination Tank Transition Level/DTTL | Destination Tank Transition Level Volume/DTTLV |
| Destination Tank Maximum Level/DTML | Destination Tank Maximum Level Volume/DTMLV |

Another purpose for defining these liquid volumes and associating them with the defined liquid levels is that if the tanks have a different length and/or width from each other, it cannot be assumed that the volume of liquid corresponding to any liquid level in one of the tanks is necessarily equivalent to the volume of liquid corresponding to an identical value for the level of liquid in the other tank. The reason for defining the volumes will become evident in the discussion below.

For source tank 100, a liquid level labeled source tank maximum level is defined and referred to using the abbreviation STML and the number 150, and extends upwards from the source tank interior bottom surface 152. STML refers to the maximum height of liquid level that will ever exist in source tank 100. For destination tank 102, two liquid levels are defined. A liquid level labeled destination tank transition level is defined and referred to using the abbreviation DTTL, and the number 156. DTTL refers to the height of liquid level in the destination tank 102 at which the destination tank valve 110 will transition between opened and closed. Another liquid level labeled destination tank maximum level is defined and referred to using the abbreviation DTML, and the number 154. DTML refers to the maximum height of liquid level that will ever exist in destination tank 102. The DTML liquid level also indicates the height of liquid level in destination tank 102 that is considered tank full level. The liquid level STML extends upwards from the source tank interior bottom surface 152. The liquid levels DTTL and DTML extend upwards from the destination tank interior bottom surface 158. FIG. 10 depicts each these liquid levels.

To further describe how the components of the embodiments work together to implement the automatic refilling functionality the discussion below describes a full refill cycle, starting with the apparatus being in an exemplary first state as depicted in FIG. 3, with both tanks being empty, and finishing with the apparatus being in an exemplary fourth state with destination tank 102 being at an optimum predefined full level, and the source tank 100 being empty. FIG. 6 depicts this exemplary fourth state.

The complete refill cycle is comprised of the following steps:

A cycle starts with the apparatus being in an exemplary first state with both tanks being completely empty. Manually operated valve 118 is opened by the user so that liquid can flow from the pressurized liquid supply source into the system through by way of the third piping segment 120. Because both tanks are empty at the start of this cycle, both the source tank valve 108 and the destination tank valve 110 will be fully open and allowing the unrestricted flow of liquid from the source pressurized liquid into the supply portion of the system.

As the pressurized fill liquid starts to flow, source tank 100 will begin to fill at a rate determined by the pressure level of the pressurized liquid supply from liquid supply connection 116, the size of the liquid channels in the valves, and the size of the piping segments. Note that because of the configuration of the piping and valves, destination tank 102 never receives any liquid from the pressurized supply source directly, but instead will eventually get liquid indirectly from source tank 100, after it passes through secondary process 128 that is situated between the two tanks. It is assumed that the liquid flow rate through any secondary process 128 and into destination tank 102 will be at a far slower flow rate than the liquid flowing into source tank 100 because the liquid flowing into source tank 100 is under pressure, and the flow out of source tank 100, then through the secondary process 128, and finally into destination tank 102 is by the process of gravity fed drainage alone.

Due to the continuous flow of pressurized liquid into it, the liquid level in source tank 100 will eventually reach the level defined previously as the liquid level, source tank maximum level, STML 150. When the liquid reaches this level, source tank valve 108 will partially close and create a restriction in the flow that will cause the level to be held at or very close to the level STML. In this state, source tank valve 108 will be allowing only enough liquid to enter source tank 100 sufficient to replace the liquid that is being slowly removed from that tank by way of drainage into secondary process. This liquid flowing out of source tank 100, into and through secondary process 128, and into destination tank 102, causes destination tank 102 to begin filling. Because this liquid is being gravity fed, it will be at a slower flow rate than the rate of the liquid flowing into source tank 100, which is pressurized.

The liquid level in source tank 100 will be held at the source tank maximum level, STML 150 while the liquid level in destination tank 102 will be increasing from empty towards the destination tank transition level, DTTL 156.

When the liquid level in destination tank 102 increases to the destination tank transition level, DTTL 156, destination tank valve 110 will close, thus causing the liquid from the pressurized liquid supply, source, via liquid supply connection 116, into the system to stop flowing. When the system enters this exemplary third state, the liquid level in source tank 100 will be at the source tank maximum level, STML 150. In this exemplary third state, liquid will still be flowing by the gravity fed drainage out of the source tank 100, into and through the secondary process 128, and into the destination tank 102 also by the process of gravity fed drainage. The result of the apparatus being in this state is that the liquid level in destination tank 102 will continue to raise slowly, above the destination tank transition, DTTL 156 while the liquid level in source tank 100 will continue to fall slowly. The effect of the liquid level in destination tank 102 increasing is that destination tank valve 110 will be held harder and harder in the closed position. With this liquid level in destination tank 102 being even higher than the destination tank transition level, DTTL 156; destination tank valve 110 will be prevented from opening again until a sufficient volume of liquid is removed from destination tank 102 by the user using destination tank liquid discharge valve 132.

After a period, 100% of the liquid that was in source tank 100 will have drained into destination tank 102. When this condition is reached, the fill cycle that started with both tanks being empty, and finishing with destination tank 102 being full, and source tank 100 being empty, is complete.

The system will remain in this state, with destination tank 102 being at the destination tank maximum level, DTML 154 and source tank 100 being empty, indefinitely until enough liquid is removed from destination tank 102 by the user so that the liquid level in destination tank 102 again falls below the destination tank transition level, DTTL 156. This can only occur when the user draws liquid out of the destination tank 102 by using the destination tank liquid discharge valve 132.

When the liquid level in destination tank 102 drops below the destination tank transition level, DTTL 156, destination tank valve 110 will again open, and another refill cycle will be started automatically.

The above described refill cycle will repeat automatically every time enough liquid is removed from destination tank 102, such that the liquid level in that tank falls below the destination tank transition level, DTTL 156.

In addition to the automatic refill cycle disclosed, all of the embodiments also implement tank overflow prevention by strategic mounting positions of the float valves in the tanks, and by the serial plumbing connection of, source tank valve 108, and destination tank valve 110. Both source tank valve 108, and destination tank actuated flow-rate control valve 110 are mounted in their respective tanks at strategically preselected heights above each tank's interior bottom surface, to cause the apparatus to implement the novel features of automatic tank refilling and tank overflow prevention. These heights are chosen in coordination with each other.

The designer of any particular implementation of an embodiment has design flexibility in selecting the mounting heights of the valves to meet any certain design optimization goal the designer might have. A possible design procedure is as follows. The height above the interior bottom surface 158, of destination tank 102, at which destination tank valve 110 is to be mounted is chosen as an independent variable. This level is referred to here as the destination tank transition level, DTTL 156. When the liquid level inside destination tank 102 reaches this level during a refill cycle, destination tank valve 110 will change from being partially open to being fully closed. When destination tank valve 110 is closed, pressurized supply liquid flowing in the system will cease. Assuming for example that the valve is placed so that the liquid level associated with it is near the mid level of the tank, there will a volume of unused liquid holding capacity above the top surface of the liquid, and below a predetermined desirable maximum full level. This unused liquid holding capacity represents the additional volume of liquid that can be added to destination tank 102 to bring the liquid level up to the level labeled destination tank maximum level, DTML 154. Source tank valve 108 is then installed in the source tank 100, at a distance above the source tank interior bottom surface 152 of source tank 100 that will limit the maximum volume of liquid in source tank 100 to an amount equal or less than the unused liquid holding volume remaining in destination tank 102. When all of the liquid has flowed out of source tank 100, then through the secondary process and into destination tank 102, the height of liquid level in destination tank 102 will be at the level labeled destination tank maximum level, DTML 154 which is near the top of the tank, but still well below a level that would cause an overflow. Shown in mathematical algebraic equation format, the valves are placed such that the relationship of the volumes of liquid in the tanks meets the following constraint.

Using the abbreviations for the liquid volumes previously defined in the table.

$$(STMLV+DTTLV) \leq DTMLV$$

The reason for placing the float valves in positions that will result in this relationship between the volumes stated above is to ensure that the destination tank 102 will never contain a volume of liquid great enough to cause it to overflow. Any particular design of the apparatus can use different choices for where the critical liquid levels are set by setting the placement of the liquid level sensing components, depending on what parameter in the particular implementation is to be optimized. For example, one application may be optimum having a lower liquid level in destination tank 102, along with a corresponding higher liquid level in the source tank 100 or vice versa.

Two specific examples are presented below to illustrate the design choices made available to a system designer.

Example 1

The position of destination tank valve 110 is preselected by the designer such that the liquid volume DTTLV is 75% of the liquid volume DTMLV, and the position of source tank valve 108 is set by the designer so that the liquid volume STMLV is 25% of the liquid volume DTMLV. With the valve mounted at the heights of the above positions, when the liquid level in destination tank 102 rises to the level DTTL, there will still be an unused liquid holding volume above the DTTL level more than large enough to hold the liquid still in source tank 100, without destination tank 102 overflowing.

Example 2

The mounting position of destination tank valve 110 is preselected by the designer such that the liquid volume DTTLV is 25% of the liquid volume DTMLV, and the mounting position of source tank valve 108 is set by the designer so that the liquid volume STMLV is 75% of the liquid volume DTMLV. With the valve mounting positions set to the above positions, when the liquid level in destination tank 102 rises to the level DTTL, there will still be an unused liquid holding volume above the DTTL, more than large enough to hold the liquid still in source tank 100, without destination tank 102 overflowing.

As used in this application, the term "a" or "an" means "at least one" or "one or more".

As used in this application the terms "single", "a single", or "the single" each mean "one and only one".

As used in this application, the term "about" or "approximately" refers to a range of values within plus or minus 10% of the specified number.

As used in this application, the term "substantially" means that the actual value is within about 10% of the actual desired value, "particularly" within about 5% of the actual desired value and "especially" within about 1% of the actual desired value of any variable, element or limit set fourth herein.

All references throughout this application, for example patent documents including issued or granted patents or equivalents, patent application publications, and non patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state means for performing a specified function, or step for performing a specified function, is not to be interpreted as a means or step clause as specified in 35 U.S.C. § 112, § 6. In particular, any use of step of in the claims is not intended to invoke the provision of 35 U.S.C. § 112, § 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A tank refilling system configured to keep a height of liquid level in a destination tank close to a predetermined fill line; said tank refilling system comprising:
   a) a source tank comprising a source tank liquid entrance opening;
   b) said destination tank comprising a destination tank liquid entrance opening and, a destination tank liquid discharge valve;
   c) a secondary process comprising a secondary process liquid inlet and, a secondary process liquid discharge outlet; said secondary process liquid inlet being in liquid communication with said source tank and, said secondary process liquid discharge outlet being in liquid communication with said destination tank;
   d) said secondary process being positioned above an interior bottom surface of said source tank, such that liquid will flow by gravity fed drainage out of said source tank, and into said secondary process liquid inlet;
   e) said secondary process being positioned above said destination tank, such that liquid will flow by gravity fed drainage out of said secondary process liquid discharge outlet, and into said destination tank liquid entrance opening;
   f) a means responsive to liquid level height in said source tank, for increasing and decreasing liquid flow rate into said source tank liquid entrance opening as liquid level height in said source tank falls below and rises to a predetermined height; and
   g) a means responsive to liquid level height in said destination tank, for increasing and decreasing liquid flow rate into said source tank liquid entrance opening, as liquid level height in said destination tank falls below and rises to a predetermined height.

2. The tank refilling system of claim 1, further comprising:
   a) a source tank valve comprising an inlet port, an outlet port, a flow rate control input, a ball float and, a float rod; wherein one end of the float rod of said source tank valve is connected to the ball float of said source tank valve and; wherein an other end of the float rod of said source tank valve is connected directly to, and operates, the flow rate control input of said source tank valve;
   b) a destination tank valve comprising an inlet port, an outlet port, a flow rate control input, a ball float and a float rod; wherein one end of the float rod of said destination tank valve is connected to the ball float of said destination tank valve and; wherein an other end of the float rod of said destination tank valve is connected directly to, and operates, the flow rate control input of said destination tank valve;
   c) one liquid flow channel comprising a plurality of piping segments, said source tank valve and, said destination tank valve; wherein said plurality of piping segments and, said source tank valve and, said destination tank valve are connected in series;
   d) a first piping segment, said first piping segment being connected between the outlet port of said destination tank valve and the inlet port of said source tank valve; and
   e) a second piping segment, said second piping segment being connected between the outlet port of said source tank valve and said source tank liquid entrance opening.

3. The tank refilling system of claim 1, further comprising:
   a) a source tank valve comprising an inlet port, an outlet port, a flow rate control input, a ball float and a float rod; wherein one end of the float rod of said source tank valve is connected to the ball float of said source tank valve and; wherein an other end of the float rod of said source tank valve is connected directly to, and operates, the flow rate control input of said source tank valve;
   b) a destination tank ball float and a destination tank alternate float rod wherein one end of said destination tank alternate float rod is connected to said destination tank ball float and wherein an other end of said destination tank alternate float rod extends upward into an interior of said source tank to a vertical distance that is proportional to a height of liquid level in said destination tank;
   c) and wherein when the height of liquid level in said destination tank rises to a predetermined height, the ball float of said source tank valve, and the float rod of said source tank valve will be held upward by said destination tank alternate float rod to a predetermined height that forces said source tank valve to close;
   d) said destination tank alternate float rod being positioned horizontally relative to a horizontal position of the ball float of said source tank valve and the float rod of said source tank valve such that said destination tank alternate float rod aligns horizontally with either the ball float of said source tank valve or with the float rod of said source tank valve, or both, such that said destination tank alternate float rod is able to interfere with an angular travel of the ball float of said source tank valve and the float rod of said source tank valve; and
   e) a first piping segment, said first piping segment being connected between the outlet port of said source tank valve and said source tank liquid entrance opening.

* * * * *